US006920477B2

(12) United States Patent
Mitzenmacher

(10) Patent No.: US 6,920,477 B2
(45) Date of Patent: Jul. 19, 2005

(54) DISTRIBUTED, COMPRESSED BLOOM FILTER WEB CACHE SERVER

(75) Inventor: Michael Mitzenmacher, Lexington, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 833 days.

(21) Appl. No.: 09/827,557

(22) Filed: Apr. 6, 2001

(65) Prior Publication Data

US 2003/0005036 A1 Jan. 2, 2003

(51) Int. Cl.$^7$ ............................................. G06F 15/16
(52) U.S. Cl. ...................... 709/203; 709/214; 709/216; 709/218; 709/246; 707/101; 711/118; 711/113
(58) Field of Search ................... 709/203, 214, 709/216, 246, 218; 707/101; 711/118, 113

(56) References Cited

U.S. PATENT DOCUMENTS

| | | | |
|---|---|---|---|
| 4,882,754 A | * 11/1989 | Weaver et al. ............... | 704/201 |
| 5,394,471 A | 2/1995 | Ganesan et al. | |
| 5,649,183 A | 7/1997 | Berkowitz et al. | |
| 5,701,464 A | 12/1997 | Aucsmith | |
| 5,737,747 A | * 4/1998 | Vishlitzky et al. .......... | 711/118 |
| 5,813,000 A | 9/1998 | Furlani | |
| 5,832,479 A | 11/1998 | Berkowitz et al. | |
| 5,864,854 A | 1/1999 | Boyle | |
| 5,946,692 A | 8/1999 | Faloutsos et al. | |
| 5,953,503 A | * 9/1999 | Mitzenmacher et al. ..... | 709/203 |
| 5,995,961 A | 11/1999 | Levy et al. | |
| 6,032,144 A | 2/2000 | Srivastava et al. | |
| 6,052,120 A | * 4/2000 | Nahi et al. .................. | 345/700 |
| 6,058,416 A | 5/2000 | Mukherjee et al. | |
| 6,061,676 A | 5/2000 | Srivastava et al. | |
| 6,073,160 A | 6/2000 | Grantham et al. | |
| 6,105,020 A | 8/2000 | Lindsay et al. | |
| 6,112,279 A | 8/2000 | Wang | |
| 6,134,551 A | 10/2000 | Aucsmith | |
| 6,182,111 B1 | 1/2001 | Inohara et al. | |
| 6,829,654 B1 | * 12/2004 | Jungck ....................... | 709/246 |

OTHER PUBLICATIONS

Fan et al. "Summary Cache: a Scalable Wide–area Web Cache Sharing Protocol," Proceedings of SIGCOMM '98, (1998: pp. 254–265).
Bloom, "Space/time Trade–offs in Hash Coding with Allowable Errors," Communication of the ACM (1970, 13 (7): pp. 422–426).
Carter et al. "Universal Classes of Hash Functions," Journal of Computer and System Sciences, (1979: pp. 143–154).
Ramakrishna, "Practical Performance of Bloom Filters and Parallel Free–text Searching," Communications of the ACM (1989, 32 (10): pp. 1237–1239).
Moffat et al., "Arithmetic Coding Revisited," ACM Transactions on Information Systems, (1998, 16(3): pp. 256–294).
Witten et al., Managing Gigabytes, (1999: pp. 35–41).
Pai–Hsiang Hsiao, "Geographical Region Summary Service for Geographical Routing" (2000, submitted to Mobicom 2001).

* cited by examiner

Primary Examiner—Anthony Knight
Assistant Examiner—Thomas Pham
(74) Attorney, Agent, or Firm—24 IP Law Group USA PLLC; Timothy R. DeWitt

(57) ABSTRACT

Compressed Bloom filters that act as a message as well as a data structure provide smaller false positive rates, reduced bits broadcast and/or reduced computational overhead in distributed Web proxy servers and other distributed networks.

17 Claims, 2 Drawing Sheets

DISTRIBUTED, COMPRESSED BLOOM FILTER WEB CACHE SERVER

STATEMENT OF GOVERNMENT INTEREST

This invention was made in part with government support under grant number CCR-9983832 from the National Science Foundation. The government may have certain rights in this invention.

FIELD OF THE INVENTION

This invention is drawn to the field of distributed caching networks, and more particularly, to a novel distributed, compressed-bloom filter Web cache server system and method.

BACKGROUND OF THE INVENTION

As Web usage increases, so does user perceived fetch latency. Distributed Web caching systems reduce fetch latency by maintaining in the cache memory of each Web server information representative of its Web objects as well as that of other, neighboring Web servers. By allowing for retrieval of desired Web objects from a neighbor's cache closer to the client than the original source, such distributed or cooperative Web caching systems reduce user perceived fetch latency.

For such distributed or cooperative Web caching systems to be effective, Web servers must have reasonably accurate information regarding the contents of other Web server caches. One possibility is for Web servers to periodically broadcast a list of their contents to other neighboring Web servers. The natural form of this list would be as a list of Uniform Resource Locators, or URLS, such as "http://www.yahoo.com." A list written in this textual form might be quite long, as Web servers may cache thousands, tens of thousands, or more Web pages. Moreover, these lists must be broadcast sufficiently often so that they are mostly accurate even as the contents in the Web server caches change over time. Hence this straightforward solution may lead to significant network traffic, undermining the possible advantages of distributed Web caching.

Fan et al. in an article entitled "Summary Cache: a Scalable Wide-area Web Cache Sharing Protocol," appearing at Proceedings of SIGCOMM '98, (1998: pp 254–265), incorporated herein by reference, disclose a distributed, Bloom filter Web cache server that maintains Bloom filter array data representative of its Web objects, as well as of other, neighboring Web servers, and that periodically broadcasts the Bloom filter array data that represents the contents of its cache to its neighbors whenever sufficiently many changes have occurred since the last broadcast. If a Web server wishes to determine if another neighboring Web server has a page in its cache upon a query miss, it checks the appropriate Bloom filter array data. Message traffic is reduced in Fan et al., since Web servers do not broadcast URL lists corresponding to the exact contents of their memory caches, but rather the succinct Bloom filter array data representative thereof.

The size of the Bloom filter array data is typically determined by the transmission protocol of the communications infrastructure. While the Bloom filter has a zero probability of producing false negatives when queried, it has an optimum non-zero probability of producing false positives for Bloom filter array data of given size. That is, it may incorrectly return that an element is in a set when it in fact is not, which leads to more message traffic and to increased user perceived fetch latency.

There is thus a need to reduce the probability of producing false positives in distributed, summary cache Web servers.

SUMMARY OF THE INVENTION

It is accordingly an object of the present invention to disclose a distributed, compressed Bloom filter Web cache server providing reduced optimum probabilities of producing false positives than the heretofore known summary cache Web servers for any given Bloom filter data array size.

In accord therewith, a distributed, compressed Bloom filter Web server providing reduced probabilities of false positives is disclosed that includes a plurality of cache servers each having a cache memory and a cache processor coupled to the memory and operative to (1) represent Web objects stored in its cache memory as a compressed Bloom filter data array having a preselected number of hash functions and a preselected array size which have been chosen to minimize the rate of false positives for a preselected target compression size; and operative (2) to periodically disseminate the compressed Bloom filter data array to neighboring servers when there is a predetermined change in its stored Web objects.

In further accord therewith, a method reducing false positives in a network having distributed Web servers each storing information in cache memory as a Bloom filter data array and broadcasting that data array to other Web servers is disclosed that includes the steps of (1) fixing a compression size for transmission of the Bloom filter data array at each Web server; (2) choosing the number of hash functions and the array size so that the Bloom filter data array minimizes the rate of false positives when it is compressed down to the fixed compression size; and (3) broadcasting the compressed Bloom filter data array to neighboring Web servers whenever there is a predetermined change in the contents of its cache memory.

User perceived fetch latency is improved, due to the reduced probabilities of false positives provided by the compressed Bloom filter data arrays in accord with the present invention, and, among other advantages, computational requirements are generally softened, due to generally reduced processing required for generating the compressed Bloom filter data arrays in accord with the present invention.

The principles of the distributed, compressed Bloom filter Web server system and method in accord with the present invention, that the Bloom filter is both a data structure in memory and an object that is broadcast, that, as having both said attributes, may be optimized for a target compression size, are applicable to distributed networks other than the distributed, compressed Bloom filter Web servers of the solely exemplary, presently preferred embodiments. For example, the inventive principles are applicable in geographic location sharing systems, where each server contains location information about mobile clients that should be distributed elsewhere, or to distributed file-sharing systems (such as, for example, Napster), where the Bloom filter would record file information instead of URL information. In any instance where information is passed in a distributed system according to a Bloom filter the compressed Bloom filter in accord with the present invention may be used to improve performance.

BRIEF DESCRIPTION OF THE DRAWINGS

These and other objects, inventive aspects and advantageous features of the present invention will become apparent as the invention becomes better understood by referring to the following, solely exemplary detailed description of the presently preferred embodiments, and to the drawings, wherein.

DETAILED DESCRIPTION OF THE PRESENTLY PREFERRED EMBODIMENTS

Figure 1A:
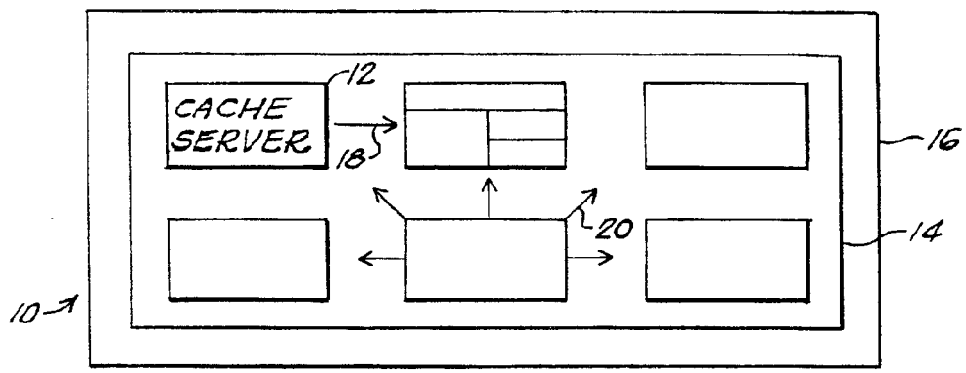
FIG. 1 in the FIG. 1A thereof is a functional block diagram illustrating a distributed, compressed Bloom filter Web server arrangement in accord with the present invention, in the FIG. 1B thereof is a functional block diagram illustrating a distributed, compressed Bloom filter Web server in accord with the present invention, in the FIG. 1C thereof is a block diagram of a prior art Bloom filter, in the FIG. 1D thereof is a block diagram of a compressed Bloom filter in accord with the present invention, and in the FIG. 1E thereof is a graph illustrating the improved false positive rejection of an exemplary embodiment of the distributed, compressed Bloom filter Web server in accord with the present invention.

Referring now to FIG. 1A, generally designated at 10 is a functional block diagram illustrating a distributed, compressed Bloom filter Web server arrangement in accord with the present invention. A plurality of cooperative cache servers 12 are operatively connected to a communications infrastructure, not shown. Any suitable communications infrastructure, such as optical fiber, or the cables of the telephone network, may be employed, and any suitable communications protocol, such as TCP/IP or UDP, may be employed.

As schematically illustrated by box 14, the plurality of cooperative cache servers 12 may, for example, be the cache servers of a LAN or those inside an ISP. As schematically illustrated by box 16, each of the plurality of cooperative cache servers is operatively connected to the outside world, as, for example, the Internet or the servers outside the ISP.

Figure 1B:
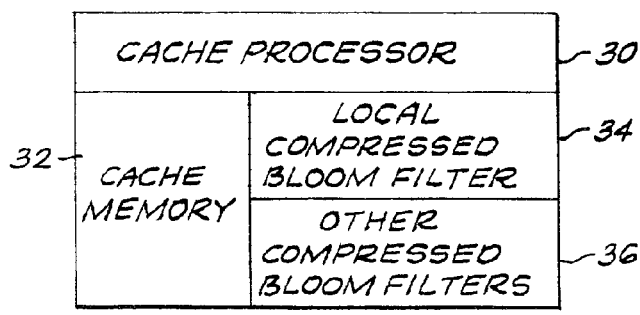

Each cache server 12 includes a cache processor 30 (FIG. 1B) operatively coupled to cache memory 32 (FIG. 1B) in which are stored a compressed Bloom filter data array 34 (FIG. 1B) representative of the Web objects located on that server and a plurality of compressed Bloom filter data arrays 36 (FIG. 1B) to be described, each representative of the Web objects located on another cooperative Web server 14. The Web objects stored in cache memory 32 of each proxy server 12 will generally be URL's.

Each cache server 12 responds to a client query to determine if the requested Web object is located in the cache memory of that server, or is located in the cache memory of a cooperative cache server 14. If it is, it retrieves the requested object either from itself, or, as schematically illustrated by arrow 18, from that one of the cooperative cache servers that does have the requested Web object. If not, it seeks the requested object in the outside world 16.

Whenever the contents of the cache memory of any cache server 12 changes sufficiently, where the amount of change might depend on the application or the parameters of the system (such as the number of cooperating machines), it disseminates a compressed Bloom filter data array to be described representative of the new contents to its neighbors 14 as schematically illustrated by arrows 20, which, in turn, decompress it, and update the compressed Bloom filter data array for that node.

The programs, not shown, controlling data structure coding, compression, transmission, and reception are stored in program memory, not shown, of each cache server. Other data structures, objects or programs, not shown, are also stored in cache, program or other memory of each cache server, such as, for example, the program that determines which Web objects and when Web are removed from the cache.

Figure 1C:
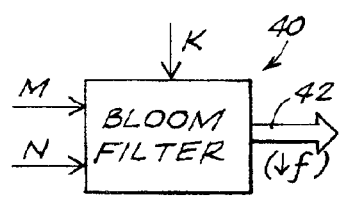

Referring now to FIG. 1C, generally designated at 40 is a block diagram useful in explaining the operation of a prior art Bloom filter. The filter 40 includes as inputs the Bloom filter data array size m and the number of Web objects n to be represented thereby. The parameters m and n to the left of the Bloom filter 40 are given as inputs, and the parameter k to the top of the Bloom filter 40, the number of hash functions, is optimized to minimize the rate $f$ of false positives. In the typical case, the Bloom filter array size m is determined by the desired message traffic of the communications protocol and infrastructure, which generally is in the range of 4–32 bits per data item, and usually is 8–16 bits, and/or by the cache memory space available. Reference in this connection may be had to Fan et al, supra, and general reference may be had to an article by Bloom entitled "Space/time Trade-offs in Hash Coding with Allowable Errors," appearing at Communication of the ACM (1970, 13 (7): pp. 422–426), incorporated herein by reference.

As appears more fully below, the number of hash functions k of the prior art Bloom filter 40 is optimized to provide Bloom filter array data schematically illustrated by arrow 42 that minimizes the rate $f$ of false positives given the Bloom filter data array m and the number of Web objects n.

A Bloom filter for representing a set $S=\{s_1, s_2, \ldots, s_n\}$ of n elements is described by an array of m bits, initially all set to zero (0). A Bloom filter uses k independent hash functions $h_1, \ldots, h_k$ with range $\{1, \ldots, m\}$. For mathematical convenience, assume these hash functions map each item in the universe to a random number uniform over the range $\{1, \ldots, m\}$.

For each element $s \in S$, the bits $h_i(s)$ are set to one (1) for $1 \leq i \leq k$. A location can be set to one (1) multiple times, but only the first change has an effect. To check if an item x is in S, check whether all $h_i(x)$ are set to one (1). If not, then x is clearly not a member of S. If all $h_i(x)$ are set to one (1), assume that x is in S, although a Bloom filter may yield a false positive, where it suggests that an element x is in S even though it is not.

The probability of a false positive for an element not in the set, or the false positive rate, can be calculated in a straightforward fashion, given the assumption that hash functions are perfectly random. After all the elements of S are hashed into the Bloom filter, the probability that a specific bit is still zero (0) is:

$$\left(1 - \frac{1}{m}\right)^{kn} \approx e^{-kn/m}.$$

Let $p=(e^{-kn/m})^k$. The probability of a false positive is then:

$$\left(1 - \left(1 - \frac{1}{m}\right)^{kn}\right)^k \approx (1 - e^{-kn/m})^k = (1-p)^k.$$

Let $f=(1-e^{-kn/m})^k=(1-p)^k$. Note the asymptotic assumption is used herein for convenience of representation.

Now suppose m and n are given and the number of hash functions k is to be optimized. There are two competing forces; using more hash functions gives more chances to find a zero (0) bit for an element that is not a member of S, while on the other hand, using fewer hash functions increases the fraction of zero (0) bits in the array.

The optimal number of hash functions that minimizes $f$ as a function of k is found taking the derivative. More conveniently, note that $f$ equals $\exp(k \ln(1-e^{-kn/m}))$. Let $g=k \ln(1-e^{-kn/m})$.

$$\frac{dg}{dk} = \ln(1 - e^{-kn/m}) + \frac{kn}{m} \frac{e^{-kn/m}}{1 - e^{-kn/m}}.$$

Minimizing the false positive rate $f$ is equivalent to minimizing $g$ with respect to $k$: The derivative is zero (0) when $k=\ln 2*(m/n)$. This is a global minimum. In this case, the false positive rate $f$ is $(\frac{1}{2})^k = (0.6185)^{m/n}$. In practice, of course, $k$ will be an integer, and smaller $k$ might be preferred, insofar as that reduces the amount of computation necessary.

Figure 1D:
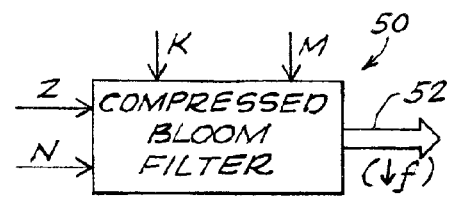

Referring now to FIG. 1D, generally designated at 50 is a block diagram useful in explaining the principles of a compressed Bloom filter in accord with the present invention. In accord with the present invention, the Bloom filter is not just an object that resides in cache memory, but an object that is transferred between proxy servers, that, as such, may be optimized to minimize the false positive rate for Bloom filter array data compressed to a transmission compression size $z$.

The filter 50 includes as inputs to the left thereof the Bloom filter data array compression size $z$ and the number of Web objects $n$ to be represented thereby. Unlike the prior art filter 40 (FIG. 1C), the size of the Bloom filter data array $m$ of the compressed Bloom filter 50 is not limited by network traffic constraints, but only by cache memory size, since it is to be compressed to the compression size $z$, which enables compressed Bloom filters in accord with the present invention to obtain better rates of false positive rejection than the prior art Bloom filter 40 (FIG. 1C) for any given Bloom filter data array compression size.

As appears more fully below, the two parameters to the top of the compressed Bloom filter 50 in accord with the present invention, namely, the number of hash functions $k$ and the Bloom filter array size $m$, are optimized to provide compressed Bloom filter array data schematically illustrated by arrow 52 that minimizes the false positive rate $f$ given the Bloom filter data array compression size $z$ and the number of Web objects $n$. In the typical case, $m$ is set as big as possible, given any cache memory space constraints, and $k$ is optimized to provide compressed Bloom filter data that minimizes the false positive rate $f$ given the Bloom filter data array compression size $z$, data array $m$ and the number of Web objects $n$. In general, fewer hash functions are required than in the prior art filter 40 (FIG. 1C), which eases the computational overhead. In the typical case, the Bloom filter array compression size $z$ is determined by the communications protocol and infrastructure, in the range of 4–32 bits per data item, usually 8–16 bits.

Let $z \geq n$ be the desired compressed size. Each bit in the bit array is zero (0) with probability $p$ if the bits are assumed to be independent. Also, as a mathematically convenient approximation, assume an optimal compressor. That is, assume that the $m$ bit filter can be compressed down to only $mH(p)$ bits, where $H(p)=-p \log_2 p - (1-p) \log_2 (1-p)$ is the entropy function. The compressor therefore uses the optimal $H(p)$ bits on average for each bit in the original string. Note that near-optimal compressors exist; arithmetic coding, for example, requires on average less than $H(p)+\in$ bits per character for any $\in >0$ given suitably large strings.

Optimization proceeds as follows. Given $n$ and $z$, choose $m$ and $k$ to minimize $f$ subject to $mH(p) \leq z$. For the prior art optimized Bloom filter where $m=z$ and $k=\ln 2*(m/n)$, $p=\frac{1}{2}$, and $f$ is $\leq (0.6185)^{z/n}$. This choice of $k$ is the worst choice possible for the design of compressed Bloom filters in accord with the present invention.

To see this, parametrize so that $k=\alpha m/n$. Then $p=e^{-\alpha}$, and $m$ and $n$ are chosen to minimize $f=(1-e^{-\alpha})^{\alpha m/n}$ subject to $m=z/H(e^{-\alpha})$, where, without loss of generality, $m$ may be chosen as large as possible. Equivalently, we have:

$$f = (1-e^{-\alpha})^{\alpha z/(nH(e^{-\alpha}))}.$$

Since $z$ and $n$ are fixed with $z>n$, we wish to maximize:

$$\beta = f^{n/z} = (1-e^{-\alpha})^{\alpha/H(e^{-\alpha})}.$$

Let $\alpha = -\ln x$. Then:

$$\beta = (1-x)^{-\ln x/H(x)} = \exp\left(\frac{-\ln(x) \cdot \ln(1-x)}{(-\log_2 e)(x \ln x + (1-x)\ln(1-x))}\right).$$

The value of $\beta$ is maximized when the exponent is maximized, or equivalently when the term, $$\gamma = \frac{x}{\ln(1-x)} + \frac{1-x}{\ln(x)},$$

is minimized.
Note that:

$$\frac{d\gamma}{dx} = \frac{1}{\ln(1-x)} - \frac{1}{\ln x} + \frac{x}{(1-x)\ln^2(1-x)} - \frac{1-x}{x \ln^2(x)}.$$

The value of $\beta$ is clearly zero (0) when $x=\frac{1}{2}$, and using symmetry it is easy to check that $d\gamma/dx$ is negative for $x<\frac{1}{2}$ and positive for $x>\frac{1}{2}$. Hence the maximum probability of a false positive using a compressed Bloom filter occurs when $x=\frac{1}{2}$, corresponding to $\alpha=\ln 2$.

This shows that $\gamma$ is maximized and hence $\beta$ and $f$ are minimized in one of the limiting situations as $x$ goes to zero (0) or one (1), corresponding to $\alpha$ going to infinity or zero (0). In each case, using for example the expansion $\ln(1-x) \approx -x - x^2/2 - x^3/3 - \ldots$, we find that $\gamma$ goes to negative one $(-1)$. Hence $\beta$ goes to one-half ($\frac{1}{2}$) in both limiting cases, and a false positive rate arbitrarily close to $(0.5)^{z/n}$ can be achieved by letting the number of hash functions go to zero (0) or infinity.

In practice, these values are constrained as, for example, at least one hash function must be used, and the number of hash functions will be an integer. Note, however, that improved performance may be achieved by taking $k < \ln 2*(m/n)$ for the compressed Bloom filter. This has the additional benefit that a compressed Bloom filter uses fewer hash functions and hence requires less computation for lookup.

Compression therefore improves performance, in terms of reducing the false positive rate for a desired compressed size. An additional benefit of the compressed Bloom filters in accord with the present invention is that they generally use a smaller number of hash functions, so that lookups are more efficient.

Figure 1E:
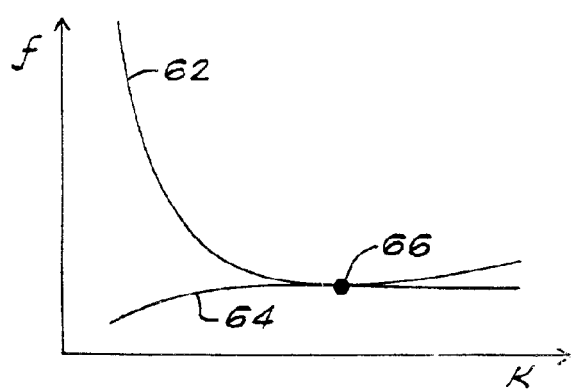

It is instructive to compare the prior art Bloom and the compressed Bloom filters in accord with the present invention pictorially in the case shown in FIG. 1E, which is a graph plotting the false positive rate $f$ as the ordinate against the number of hash functions $k$ as the abscissa, where for the standard Bloom filter $m/n=8$ and for the compressed Bloom filter $z/n=8$, and where $k$ conformably to the foregoing analysis is assumed to behave as a continuous variable. The curve 62 represents the performance of the prior art Bloom filters. The curve 64 that of the compressed Bloom filters in accord with the present invention. The point marked 66 depicts the value of k that gives optimal false positives for the prior art Bloom filter. Note that the optimized uncompressed filter actually yields the largest false positive rate vis-a-vis the compressed Bloom filters of the present invention.

Any suitable hash functions, such as the standard universal families of hash functions described by Carter et al. in an article entitled "Universal Classes of Hash Functions," appearing at Journal of Computer and System Sciences, (1979: pp. 143–154), and by Ramakrishna in an article entitled "Practical Performance of Bloom Filters and Parallel Free-text Searching," appearing at Communications of the ACM (1989, 32 (10): pp. 1237–1239), both incorporated herein by reference, or the MD5 used by Fan et al. in the hereinabove incorporated article, may be employed.

In situations where hashing performance is not sufficiently random, compressed Bloom filters will still generally outperform the uncompressed Bloom filters of the prior art. The point is that if the false positive rate of a compressed Bloom filter is increased because of weak hash functions, the false positive rate of the uncompressed Bloom filter will increase as well. Moreover, since compressed Bloom filters generally use fewer hash functions, the effect will be worse for the uncompressed prior art filters.

Any suitable compression technique, such as arithmetic coding described by Moffat et al. in an article entitled "Arithmetic Coding Revisited," appearing at ACM Transactions on Information Systems, (1998, 16(3): pp. 256–294), and by Witten et al. in a book entitled Managing Gigabytes, (1999: pp. 35–41), both incorporated herein by reference, may be employed. Arithmetic coding provides a flexible compression mechanism for achieving near-optimal performance with low variability. Generally speaking, for a random m bit string of where the bit values are independent and each bit is zero (0) with probability p and one (1) with probability 1−p, arithmetic coding compresses the string to near $mH(p)$ bits with high probability, with the deviation from the average having a Chernoff-like bound.

Figure 2A:
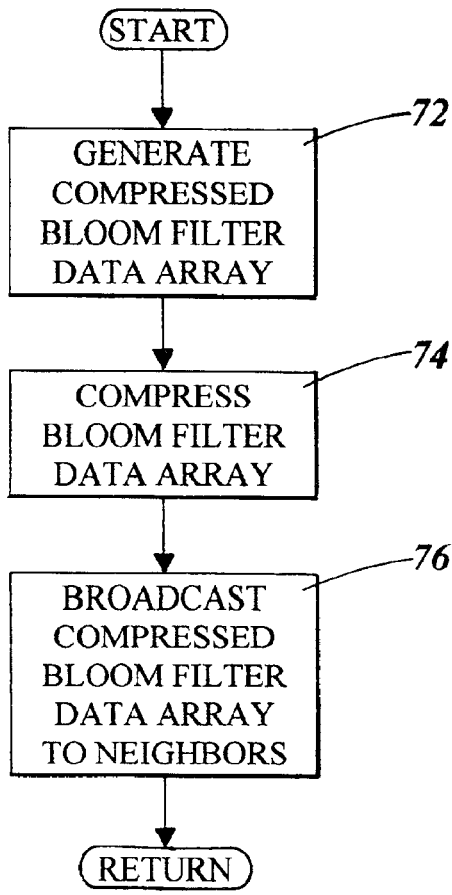
FIG. 2 in the FIGS. 2A, 2B thereof are flowcharts illustrating the operation of the distributed, compressed Bloom filter Web server in accord with the present invention.

Referring now to FIG. 2A, generally designated at 70 is a flow chart illustrating the operation of a cache processor of the distributed, compressed Bloom filter cache server in accord with the present invention whenever any cache processor needs to broadcast upon change of the Web objects stored in its cache memory. At such times, the processor is operative to generate a compressed Bloom filter data array as shown by block 72. The compressed Bloom filter parameters can be optimized to reduce the number of bits broadcast, the false positive rate, and/or the amount of computation per lookup. As shown by block 74, the cache server processor then compresses it using a preselected compression algorithm, such as arithmetic coding, and as shown by block 76, it then broadcasts the compressed Bloom filter data array, together with header information identifying itself, to all its neighbors.

Figure 2B:
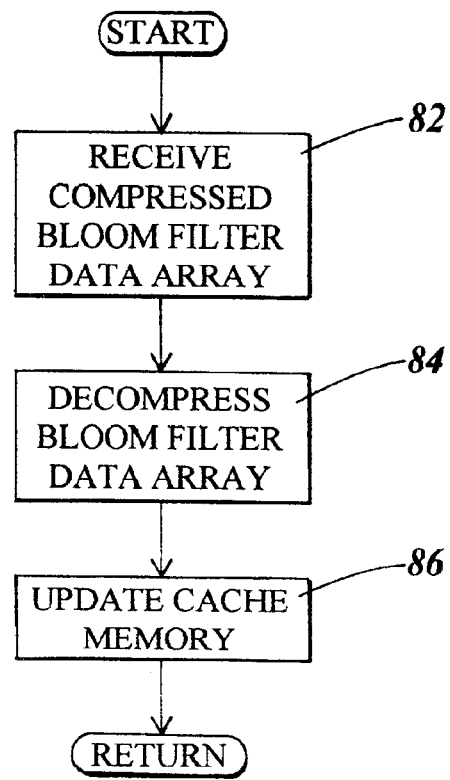

Referring now to FIG. 2B, generally designated at 80 is a flow chart illustrating the operation of a cache processor of the distributed, compressed Bloom filter cache server in accord with the present invention whenever it receives a broadcast from one of its neighbors. At such times, the processor is operative to receive the compressed Bloom filter data array as shown by block 82, and, as shown by block 84, it then decompresses the received compressed Bloom filter data array and extracts the decompressed Bloom filter data array and the identifying header. As shown by block 86, the cache processor then updates its cache memory with the compressed Bloom filter data array corresponding to the appropriate cache server.

SIMULATION EXAMPLES

It may be instructive to consider some simulation examples. A maximum desired uncompressed size m was chosen and arithmetic coding using the publicly available arithmetic coding compressor described by Carpinelli et al. in an article entitled "Source Code for Arithmetic Coding, Version 1," available at HTTP://www.cs.mu.oz.au/~alistair/arith_coder/, (March, 1995), incorporated herein by reference, and described by Moffat et al., supra, was employed. The parameters of the compressed Bloom filter were chosen using a slightly smaller compressed size than desired to provide room for some variability in compression. The amount of room necessary depends on m. A similar effect may be achieved by slightly overestimating n. If the uncompressed filter is more than half full of zeros, then we can have fewer than expected elements in the set, and the filter will tend to have even more zeros than expected, and hence will compress better. In this manner, the compressed filter should be the desired size with high probability.

The following experiment was repeated 100,000 times. A Bloom filter for n=10,000 elements and m=140,000 bits was created. Each element was hashed into two positions chosen independently and uniformly at random in the bit array. The resulting array was compressed using the Carpinelli et al. arithmetic coding compressor. Using $z=mH(p)$, the compressed size was near 9,904 bytes; to meet the bound of eight bits per element required the compressed size not exceed 10,000 bytes.

Over the 100,000 trials, the average compressed array size was found to be 9,920 bytes, including all overhead. The standard deviation was 11.375 bytes. The maximum compressed array size was only 9,971 bytes, giving several bytes of room to spare. For larger m and n, even greater concentration of the compressed size around its mean is expected; for smaller m and n, the variance would be a larger fraction of the compressed size.

Better performance could have been achieved by using just one hash function, although this would have increased the number of array bits per element, as seen in Table 1, below.

| Array bits/element | m/n | 8 | 14 | 92 |
|---|---|---|---|---|
| Transmission bits/element | z/n | 8 | 7.923 | 7.923 |
| Hash functions | k | 6 | 2 | 1 |
| False positive rate | f | 0.0216 | 0.0177 | 0.0108 |

A Bloom filter where z/n=m/n=16 was considered, where 11 hash functions were employed to achieve an optimal false positive rate of 0.000459. As 11 hash functions was seemingly large it was noted that the number of hash functions could be reduced without applying compression, but using only six hash functions more than doubles ƒ to 0.000935.

Table 2, below, summarizes the improvements available using compressed Bloom filters in accord with the present invention.

| Array bits/element | m/n | 16 | 28 | 48 |
|---|---|---|---|---|
| Transmission bits/element | z/n | 16 | 15.846 | 15.829 |
| Hash functions | k | 11 | 4 | 3 |
| False positive rate | f | 0.000459 | 0.000314 | 0.000222 |

For 28 array bits per element, the false positive rate fell about 30 percent while using only four hash functions. For 48 array bits per element, the false positive rate fell over 50 percent using only three hash functions. The case where n=10,000 elements, m=480,000 bits, and k=3 hash functions was simulated using 100,000 trials. The considerations described above suggested the compressed size was 19,787 bytes. Over the simulation trials, the average compressed array size was 19,805 bytes, including all overhead. The standard deviation was 14,386 bytes, and the maximum compressed array size was only 19,865 bytes, well below the 20,000 bytes available.

Many modifications of the presently disclosed invention will become apparent to those of skill in the art who have benefitted from the present disclosure. For example, multiple filter types may be employed in cases where the array data does not compress adequately. For example, each filter type t is associated with an array of size m, a set of hash functions, and a compression technique. These types are agreed on ahead of time. A few bits of the header can be used to represent the filter type. If one of the filter types is the prior art Bloom filter, then the set can always be sent appropriately using at least one of the types. In most cases two types, compressed and uncompressed, would be sufficient.

Fan et al. in their article entitled "Summary Cache: a Scalable Wide-area Web Cache Sharing Protocol," appearing at Proceedings of SIGCOMM '98, (1998: pp 254–265), describe two possible approaches that may be improved using compressed Bloom filters in accord with the present invention. First, when update messages are sent among neighboring Web servers, it may be possible to send a bit vector representing the difference between the last update rather than an entirely new Bloom filter. For example, suppose the system is set so that when five (5) % of the bits in the Bloom filter have changed, an update is sent denoting only which bits in the Bloom filter array have been changed. Rather than sending a Bloom filter, the message sent is therefore a Bloom filter delta representing the change in the Bloom filter. Just as the present invention demonstrates that a Bloom filter can be compressed to improve performance, similarly the Bloom filter delta can be compressed to improve performance, in an entirely similar manner. Using compressed Bloom filter delta may therefore allow even larger Bloom filters to be used, further decreasing the probability of a false positive.

Fan et al. also describe a counting Bloom filter, in which each entry in the size m table representing the Bloom filter is not a bit but a counter that can represent for example the numbers 0–15 using four bits. Counting Bloom filters are not passed as messages in the application described in the paper. If it is desirable to pass counting Bloom filters as messages, then improvements could be made by sending a compressed counting Bloom filter in a manner similar to that described above for the standard Bloom filter. That is, the counts represented in the counting Bloom filter would be compressed via arithmetic coding or some other compression method, and the compressed form would be transmitted. Again this allows a decrease in the probability of a false positive while transmitting the same or fewer bits throughout the system.

The principles of the distributed, compressed Bloom filter Web server in accord with the present invention may be implemented in distributed systems or networks other than that of the distributed Web server of the exemplary, presently preferred embodiments. For example, compressed Bloom filters in accord with the present invention may advantageously be employed in geographic location sharing systems. An example of a geographic location sharing system based on Bloom filters is described, for example, in the paper "Geographical Region Summary Service for Geographical Routing" by Pai-Hsiang Hsiao (2000, submitted to Mobicom 2001), incorporated herein by reference. Mobile agents wander through a neighborhood, represented by, for example, a square grid (other shapes are possible; the square grid is described for convenience). This square grid is divided recursively into several subsquares. The IDs of mobile agents in each subsquare can be succinctly represented by a Bloom filter, which is passed among mobile or stationary agents that keep track of location data. In this case finding the approximate location of a mobile agent can be done with high probability by checking the appropriate Bloom filters; this information can be used to route packets toward a mobile agent when data is to be sent. These Bloom filters must be updated regularly in order to cope with mobility. Using compressed Bloom filters will improve the accuracy while allowing the same number of bits to be transmitted.

The principles of the distributed, compressed Bloom filter Web server in accord with the present invention may be implemented in applications for other distributed systems or networks. For example, general file names instead of URLs may be used in a distributed file sharing system with compressed Bloom filters.

What is claimed is:

1. A distributed, compressed bloom filter Web server providing reduced probabilities of false positives, comprising:

a plurality of cache servers each having a cache memory and a cache processor coupled to the memory that is operative (1) to represent Web objects stored in its cache memory as a Bloom filter data array having a preselected number of hash functions and a preselected array size which have been chosen to minimize the rate of false positives for a preselected transmission size when said preselected transmission size differs from said preselected array size, (2) to compress the Bloom filter data array to said transmission size, and (3) to periodically disseminate the compressed Bloom filter data array to neighboring servers when there is a change in its stored Web objects.

2. The distributed, compressed Bloom filter Web server providing reduced probabilities of false positives of claim 1, wherein the Bloom filter data array size is made as large as possible for a given cache memory size.

3. The distributed, compressed Bloom filter Web server providing reduced probabilities of false positives of claim 1, wherein arithmetic coding is employed to compress the Bloom filter data array to said transmission size.

4. The distributed, compressed Bloom filter Web server providing reduced probabilities of false positives of claim 1, wherein said cache processor is further operative to store in its cache memory at least one decompressed Bloom filter data array representative of Web objects stored in a different Web server.

5. A method of reducing false positives in a network having distributed Web servers each storing information in cache memory as a Bloom filter data array representative of the information in its cache memory and broadcasting that data array to other Web servers periodically, comprising:

generating a Bloom filter data array representing a plurality of Web objects by choosing a number of hash functions and an array size for a Bloom filter, wherein said chosen array size is greater than a fixed transmission size and said number of hash functions is chosen to minimizes a rate of false positives in said Bloom filter data array after said Bloom filter data array has been compressed to said fixed transmission size, transmitted, and decompressed.

6. A distributed computer network, comprising:

a plurality of periodically intercommunicating distributed network nodes;

each node including a cache memory and a processor coupled to the cache memory operative to (1) represent in its memory contents as a Bloom filter data structure having a preselected number of hash functions and a preselected array size which have been chosen for a target compression size to optimize at least one of the rate of false positives of the Bloom filter representing the memory contents and the computational requirements of the preselected number of hash functions when said target transmission size is less than said preselected array size, to (2) compress the Bloom filter data structure to the target compression size using a predetermined compression algorithm, and to (3) broadcast the compressed Bloom filter data structure to at least one other node whenever the contents of its cache memory has changed.

7. The distributed computer network of claim 6, wherein said nodes are Web proxy servers.

8. The distributed computer network of claim 6, wherein said nodes are mobile or stationary agents in a network of mobile nodes, and the Web objects correspond to agent locations.

9. The distributed computer network of claim 6, wherein said predetermined compression algorithm is arithmetic coding.

10. A method employing compressed Bloom filters for storing and transmitting data in a distributed network of nodes each having a processor coupled to a memory, comprising:

representing the data contents of a memory of a node as a compressed Bloom filter data structure stored in a memory of a node having a preselected number of hash functions and a preselected array size which have been chosen to optimize at least one of the rate of false positives of the Bloom filter representing the data contents and the computational requirements of the preselected number of hash functions for a transmission compression size when said transmission compression size is less than said preselected array size;

compressing the Bloom filter data structure to the transmission compression size; and periodically transmitting the compressed Bloom filter data structure to at least one other node.

11. A method of storing data in memory for transmission, comprising:

representing the data in said memory as a compressed Bloom filter data structure having a preselected number of hash functions and a preselected array size which have been chosen for a target transmission compression size to optimize at least one of the rate of false positives of the Bloom filter data structure representing the data and the computational requirements of the preselected number of hash functions when said target transmission compression size is less than said preselected array size.

12. A distributed computer network, comprising:

a plurality of periodically intercommunicating distributed network nodes;

each node including a cache memory and processor coupled to the cache memory operative to (1) represent its memory contents as a Bloom filter data structure having a preselected number of hash functions and a preselected array size which have been chosen for a target rate of false positives to optimize at least one of a target compression size of the Bloom filter data structure and computational requirements of the preselected number of hash functions when said target compression size is less than said preselected array size, (2) compress the Bloom filter data structure to the target compression size using a predetermined compression algorithm, and (3) broadcast the compressed Bloom filter data structure to at least one other node whenever the contents of its cache memory have changed.

13. The distributed computer network of claim 12, wherein said nodes are web proxy servers.

14. The distributed computer network of claim 12, wherein said nodes are mobile or stationary agents in a network of mobile nodes, and the Web objects correspond to agent locations.

15. The distributed computer network of claim 12, wherein said predetermined compression algorithm is arithmetic coding.

16. A method employing Bloom filters for storing and transmitting data in a distributed network of nodes each having a processor coupled to a memory, comprising:

representing the data contents of the memory of a node as a Bloom filter data structure stored in memory of a node, said Bloom filter data structure having a preselected number of hash functions and a preselected array size which have been chosen to optimize a transmission compression size of the Bloom filter data structure for a given rate of false positives when said transmission compression size is less than said preselected array size;

compressing the Bloom filter data structure to the transmission compression size; and periodically transmitting the compressed Bloom filter data structure to at least one other node.

17. A method of storing data in memory far transmission, comprising:

representing the data as a Bloom filter data structure in said memory, said Bloom filter data structure having a preselected number of hash functions and a preselected array size which have been chosen for a target rate of false positives to optimize a transmission compression size of the Bloom filter data structure when said transmission compression size is less than said preselected array size.

* * * * *